Figure 1A:
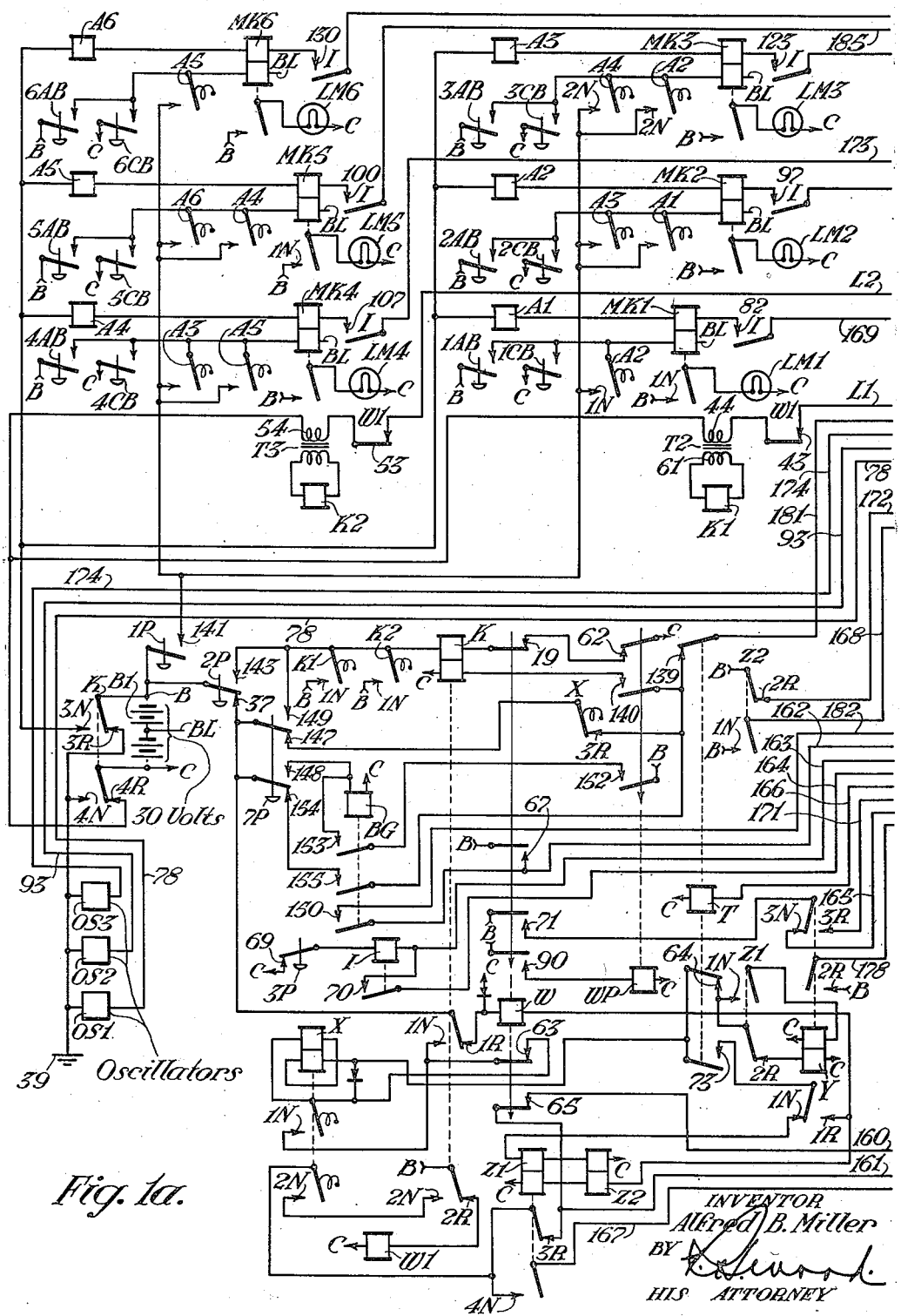

May 14, 1946.  A. B. MILLER  2,400,257
SELECTIVE CONTROL AND INDICATION SYSTEM
Filed June 9, 1942   3 Sheets-Sheet 1

INVENTOR
Alfred B. Miller
BY
HIS ATTORNEY

Patented May 14, 1946

2,400,257

UNITED STATES PATENT OFFICE 2,400,257

SELECTIVE CONTROL AND INDICATION SYSTEM

Alfred B. Miller, Edgewood, Pa., assignor to The Union Switch & Signal Company, Swissvale, Pa., a corporation of Pennsylvania Application June 9, 1942, Serial No. 446,399

17 Claims. (Cl. 102—11)

My invention relates to selective control and indication systems, and more particularly to systems for selectively controlling, indicating and testing a plurality of electrical equipments.

Control and indication systems are frequently required to control a plurality of electrical equipments which are located at different locations remote from the control point. In such systems it is desirable that the condition of each of the different equipments be individually indicated at the control point to aid the operator. Also, it is desirable that the operator be able to test from time to time the different equipments to check their operative conditions without actually operating the equipment. Furthermore, it is in the interest of simplicity and economy that these functions be accomplished by use of a single circuit extending between the control point and the locations of the different equipments.

A feature of my invention is the provision in systems of the class here involved of apparatus incorporating novel and improved means for controlling, operating and testing from a central office a plurality of remotely disposed electrical equipments and for indicating at such office the condition of each such equipment, and wherewith these several functions are accomplished by use of a single circuit between the office and the locations of the different equipments.

Another feature of my invention is the provision in systems of the type here involved of apparatus incorporating novel means wherewith the operator can control and operate any one of a group of electrical equipments individually or control and operate the entire group simultaneously or control and operate selected ones of the group simultaneously.

Another feature of my invention is the provision of improved apparatus for automatically indicating at a control point the occurrence of a designated event at any one of a group of electrical equipments and to automatically or semi-automatically operate the equipment at which such event occurs by energy supplied at the control point.

Another feature of my invention is the provision in systems of the type here contemplated of improved apparatus wherewith a relatively large number of electrical equipments may be arranged in preselected groups, and the several groups controlled, operated and indicated by a single control means common to all of the different groups.

An important feature of my invention is the provision of novel and improved apparatus for automatically indicating at a central point when and what mines of a submarine mine field are contacted by vessels and for firing the contacted mines.

Another feature of my invention is the provision of improved means for automatically firing the mine on each side of a contacted mine simultaneously with the firing of the contacted mine.

Another feature of the invention is the provision of novel means for automatically disarming all mines of a mine field that have for any reason become armed.

Still another feature of the invention is the provision of novel means for manually firing any mine of a mine field whether or not such mine has been armed due to contact by a vessel.

Again, a feature of the invention is the provision of improved apparatus wherewith each mine of the mine field and the apparatus associated therewith can be tested and indicated at the central control point without firing the mine.

Other features, objects and advantages of my invention will appear as the specification progresses.

The above features, objects and advantages of my invention are attained by using periodic currents of different preselected frequencies for selecting and indicating a plurality of electrical equipments, there being a different frequency for each equipment. I also use direct current of two different voltages, one voltage, a relatively low voltage, being used for the energization of control relays and similar devices, and the other voltage, a relatively high voltage, being used for operation of operating elements of the different equipments. I use in addition alternating current of a relatively low voltage and preselected frequency as a current of a particular characteristic for resetting and testing the equipments and, under certain circumstances, for conditioning a selected equipment for subsequent operation. These several sources of current are located at the control office and current from each source is supplied to the equipments through a transmitting circuit. Because of the different characteristics of the different currents, a single two-conductor transmitting circuit can be used, this circuit extending from the office to a distribution point or station located convenient to the electrical equipments and from which distribution point or station current is delivered to the equipments over multiple extensions of the transmitting circuit. Frequency responsive receiving devices or relays, one for each electrical equipment, are provided at the distribution point and connected to the transmitting circuit in multiple, each device being energized only by periodic current of the frequency preselected for the respective equipment. Each such receiving device when energized functions to extend the transmitting circuit to the respective equipment so that control, operation and testing currents supplied to the transmitting circuit subsequent to such selection are delivered to the selected equipment. A control means having one or more series of successively operated contacts is provided at the office. This control means is normally inactive and operation thereof is initiated either automatically or manually as desired. Automatic operation of the control means is effected in response to the occurrence of a predetermined event at any one of the equipments by the transmitting circuit being normally excited by the low voltage direct current source and a normally open contact, one at each of such equipments, being closed to complete a low resistance shunt path across the transmitting circuit when the predetermined event occurs at the equipment. Such low resistance shunt path across the transmitting circuit causes an impulse of current to flow in the transmitting circuit and an office means connected to the circuit is energized thereby to initiate an operation of the control means. Operation of one series of the successively operated contacts of the control means connects the sources of periodic current one at a time to the transmitting circuit for selectively exciting the receiving devices and then subsequently connecting the source of operating current or the source of current of particular characteristic for operating the respective equipment or for testing and resetting of such equipment as predetermined by the operator at the office. The operation of this series of contacts or a similar series of contacts successively connects indication devices one at a time to the transmitting circuit to indicate the selected equipment, there being a particular indication device for each electrical equipment. Manual operation is effected through manually operable circuit controllers provided at the office and by which the operator can govern the control means and the connections of the several current sources to the transmitting circuit.

Where a relatively large number of electrical equipments are required, I prefer to arrange them in groups with each group provided with a distribution point which has its own transmitting circuit from the office. The office control means is then provided with additional series of successively operated contacts, so that the office current sources and indication devices are connected to the different transmitting circuits.

I shall describe one form of apparatus embodying my invention and shall then point out the novel features thereof in claims.

Figure 1B:
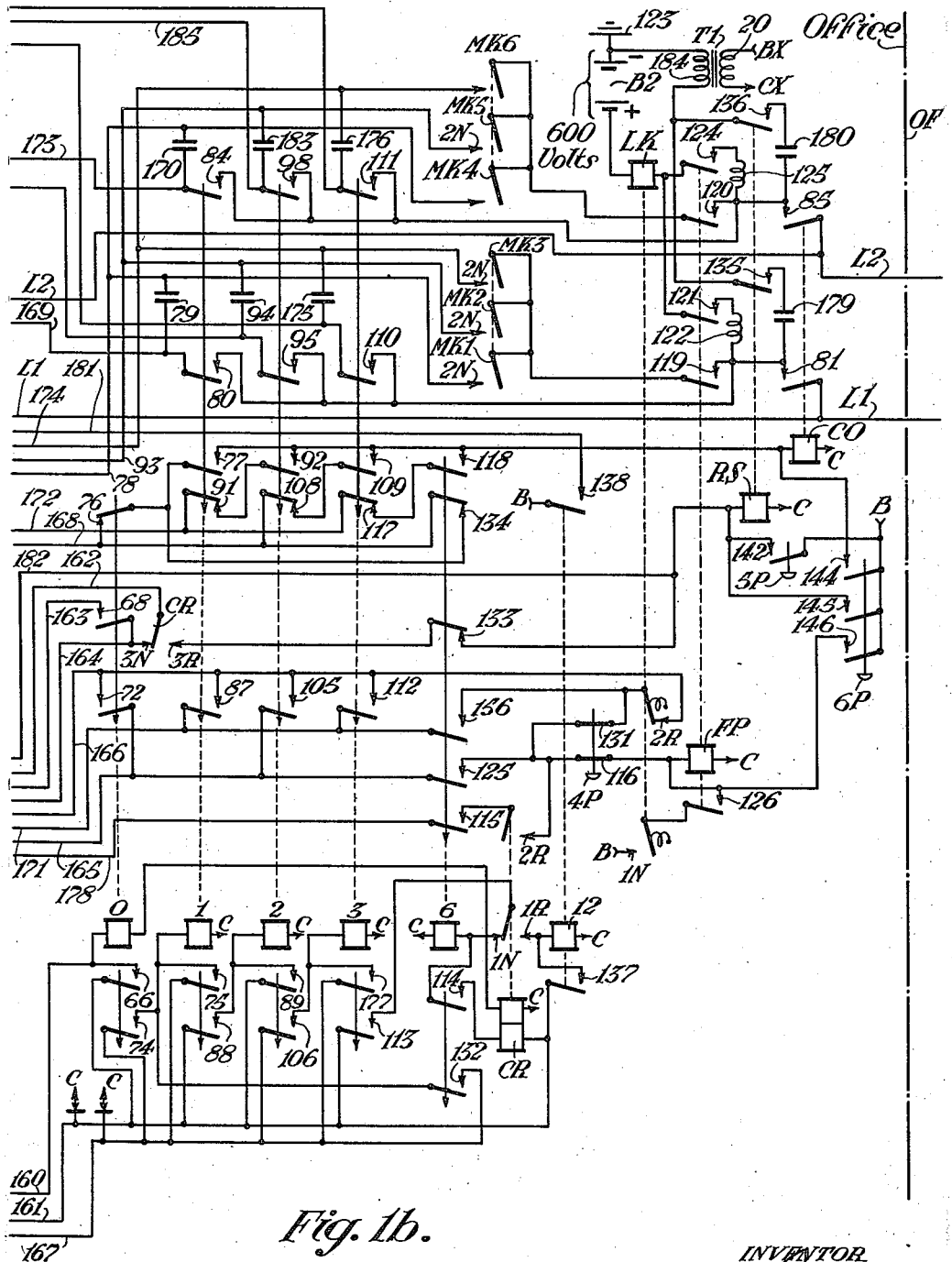
Figure 1C:
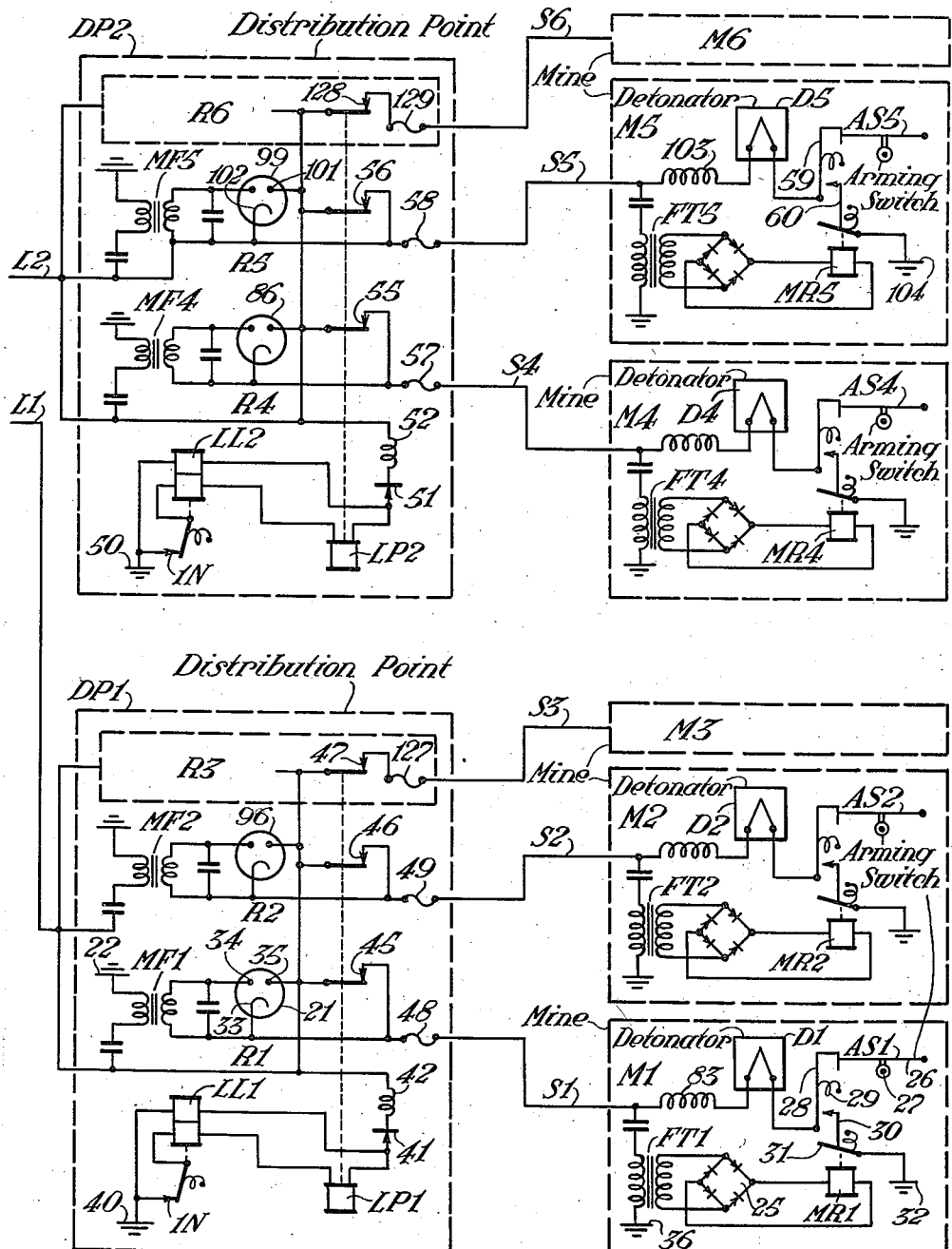

In the accompanying drawings, Figs. 1a, 1b and 1c when arranged in the order named, with Fig. 1a placed at the left, are a diagrammatic view showing one form of apparatus embodying my invention when used for a mine field. It is to be understood that I do not limit my invention to mine fields, and this one illustration is merely an example of many applications for my invention.

Referring to the drawings, the reference character OF (Figs. 1a and 1b) designates an office, with which is associated a mine field comprising a number of mines (Fig. 1c) each designated by the reference character M with a distinguishing suffix. The office OF may be on shore in the vicinity of a harbor that is to be defended by the mine field. Only six mines M1 to M6, inclusive, of the mine field are shown since these are sufficient to fully illustrate the invention. It is contemplated that the mine field would consist of a relatively large number of mines and mines M1, M2 and M3 are three mines of a first group of mines common to a distribution point or station DP1, and mines M4, M5 and M6 are three mines of a second group of mines common to a distribution point DP2. It is to be understood, of course, that each group of mines may include additional mines and that the mine field may include additional groups. The distribution points DP1 and DP2 may be in suitable housings anchored at convenient points in the harbor.

A transmitting circuit extends between the office OF and each of the distribution points DP1 and DP2, the circuit to distribution point DP1 including a single conductor cable L1 as one side of the circuit, and the circuit to distribution point DP2 including a single conductor cable L2 as one side of that circuit. The return side of each transmitting circuit is completed through the ground although a metallic conductor can be used. Each such transmitting circuit is extended from the respective distribution point to each mine of the associated group of mines by a circuit extension including a single conductor cable and ground, cables S1, S2 and S3, extending from distribution point DP1 to mines M1, M2 and M3, respectively, and single conductor cables S4, S5 and S6, extending from distribution point DP2 to mines M4, M5 and M6, respectively. That is to say, each transmitting circuit is a two-conductor circuit which as disclosed includes a single conductor cable as one side of the circuit and the ground path as the other side of the circuit.

The office equipment is disclosed in Figs. 1a and 1b, and comprises as essential elements sources of periodic current of different frequencies, two sources of direct current, a source of current of a particular characteristic, control means, indication means and manually operable circuit controlling devices. The sources of periodic current comprise oscillators OS1, OS2 and OS3, and which oscillators are shown conventionally since they may be of any one of several well-known types of construction, such as electron tube oscillators. It is sufficient for this disclosure to point out that oscillators OS1, OS2 and OS3 are constantly active to deliver periodic currents of different frequencies, which I shall designate as frequency $f1$, $f2$ and $f3$, respectively. In practicing the invention there would be provided a different oscillator for each mine of each group of mines, so that there would be a different frequency for each mine of each group. In the present disclosure oscillator OS1 which supplies current of the frequency $f1$, is associated with the first mine M1 of the first group of mines, and also with the first mine M4 of the second group. Oscillator OS2 which supplies current of the frequency $f2$, is associated with the second mine M2 of the first group, and with the second mine M5 of the second group, and in like manner oscillator OS3 which supplies current of the frequency $f3$, is associated with mines M3 and M6 of the respective groups of mines.

Batteries B1 and B2 are the two office sources of direct current, battery B1 supplying current at a relatively low voltage, such as, for example 30 volts, and battery B2 supplying current of a relatively high voltage, such as, for example, 600 volts. The battery B1 which supplies 30 volts is used for control and indication purposes, while the battery B2 which supplies 600 volts, is used for operation purposes. The source of current of particular characteristic is a transformer T1, primary winding 20 of which is connected to any convenient source of 60 cycle alternating current, having terminals indicated at BX and CX. That is to say, the current of particular characteristic here employed is a 60 cycle alternating current. It is to be understood that the invention is not limited to the above frequencies, voltages and characteristics of the different currents, and that other frequencies, voltages and characteristics may be used if desired.

The office control means comprises a group of chain or stepping relays 0, 1, 2, 3 and 6; transmitting relays T, X, Y, Z1 and Z2; and delivery relays CO, RS, FP and LK, these different relays of the control means being operated in a step-by-step manner through a predetermined operation cycle. As will appear hereinafter, the stepping relays 1, 2 and 3 are provided with contacts which are arranged in different series. One series of contacts connects the oscillators one at a time to the transmitting circuit extending to distribution point DP1. As disclosed, this same series of contacts connects different sets of indication relays one set at a time to this transmitting circuit, although a different series of contacts for the indication relays may be used. Similarly, another series of contacts connects the oscillators and other indication relays to the transmitting circuit extending to distribution point DP2. Additional relays K, K1, K2, W, W1, WP, I, BG, CR and 12 are associated with the control means for initiating, arresting and terminating the operation cycle of the control means.

The office indication means comprises a group of indication relays for each mine group, there being a main indication relay MK, plus a distinguishing numeral, and an auxiliary indication relay A, plus a distinguishing numeral, for each mine. For example, main indication relay MK1 and auxiliary indication relay A1 are associated with mine M1.

The manually operable devices at the office are two-position circuit controllers each designated by the reference character P with a distinguishing prefix, and which controllers may be spring return type of push button or may be non-biased switches.

Each distribution point DP1 and DP2 is provided with a frequency responsive receiving device or relay for each mine associated with such distribution point, receiving devices R1, R2 and R3 being provided at distribution point DP1 for mines M1, M2 and M3, respectively; and receiving devices R4, R5 and R6 being shown at distribution point DP2 for mines M4, M5 and M6, respectively. These receiving devices are preferably similar in construction and may be of any one of several forms of frequency responsive relays. As here disclosed, receiving device R1, for example, comprises a filter MF1 and a cold cathode gas triode electron tube 21. Filter MF1 connects tube 21 to the transmitting circuit, the input side of filter MF1 being connected between conductor L1 and ground electrode 22, and its output side being connected between cathode 33 and a control electrode 34 of the tube 21. Filter MF1 is proportioned to pass current only of the frequency $f1$, that is, to pass only current supplied by oscillator OS1 at the office, and which oscillator is the one associated with the same mine M1 with which receiver R1 is associated. Thus when periodic current of the frequency F1 is supplied to the transmitting circuit extending to distribution point DP1, an electromotive force is applied across electrodes 34 and 33 of tube 21, and the tube is excited and conditioned to become ionized if at the same time a proper voltage is applied to the anode 35 of the tube. The parts are so proportioned that tube 21 is ionized and becomes conductive when a voltage from battery B1 or B2 or transformer T1 is applied to the anode of the tube at a time the control electrode 34 is excited through filter MF1. The remaining receiving devices are of like construction except for the tuning of the respective filter. Filter MF2 of receiving device R2 is proportioned to pass only current of the frequency $f2$, that is, only that supplied by oscillator OS2, which is the oscillator associated with mine M2 with which receiving device R2 is also associated. At distribution point DP2, a filter MF4 of the receiving device R4 is proportioned to pass only current of the frequency $f1$, the same filter MF1 of the receiving device R1, and filter MF5 is proportioned to pass only current of the frequency of $f2$, the same as filter MF2. It follows that when periodic current of the frequency of $f1$ is supplied to the two transmitting circuits, the receiving devices R1 and R4 are excited and become conditioned to be ionized if a voltage from battery B1 or B2 or transformer T1 is supplied to the transmitting circuits at the same time. Likewise, receiving devices R2 and R5 are excited and become conductive if oscillator OS2 is connected to the transmitting circuits along with either battery B1 or B2 or transformer T1. The receiving devices R3 and R6 are shown conventionally only for the sake of simplicity, since their construction is similar to that of the other receiving devices except for the fact that the filters of receiving devices R3 and R6 are tuned to pass only current of the frequency of $f3$ which is the frequency for oscillator OS3 associated with mines M3 and M6 with which receiving devices R3 and R6 are also associated. The manner whereby each receiving device when rendered conductive extends the transmitting circuit to the respective mine will be explained later. Each distribution point is also provided with two relays designated LL and LP with appropriate numerals, and the functions of these relays will also appear later.

The electrical equipment at each mine comprises an operating element in the form of a detonator, a circuit controller in the form of an arming switch, a filter and a relay, these devices being identified by the reference characters D, AS, FT and MR, respectively, plus a numeral corresponding to the numeral of the mine. These mine equipments are all alike, and a description of one will suffice for all.

Referring to mine M1, for example, its filter FT1 has its input side connected between cable S1 and ground electrode 36, and its output side connected to relay MR1 through a full wave rectifier 25 as will be apparent by an inspection of Fig. 1c. Filter FT1 is proportioned to pass only current corresponding to the frequency of the particular characteristic current, that is, to pass only current corresponding to 60 cycle alternating current, and hence when current of 60 cycles is passed by the receiving device R1 to the circuit extension including cable S1, the relay MR1 is energized by unidirectional current. Detonator D1 is of the usual form and is active to fire the mine when current of 600 volts is supplied thereto, but current of 30 volts as supplied by battery B1 or current of a voltage supplied by transformer T1 is insufficient to actuate the detonator. Arming switch AS1 may be any one of several known types, and as here disclosed it includes a tilting member 26 which is mounted on the mine to normally occupy a horizontal position, that is, the position shown in Fig. 1c, and to be tilted about a pivot 27 when a vessel contacts the mine.

At the normal position of the switch, the member 26 engages a contact member 28 to hold contact member 28 to the left in opposition to a bias spring 29, but when a vessel contacts the mine and member 26 is tilted to swing free of contact member 28, contact member 28 is moved to the right under the force of spring 29 to engage a contact 30 and arm the mine by completing a circuit path from detonator D1 to ground electrode 32. Contact 30 is attached to armature 31 of relay MR1. When relay MR1 is energized to attract its armature 31, with the arming switch AS1 in its normal position, the contact 30 is moved to engage contact member 28 and arm the mine. If arming switch AS1 has been previously actuated to arm the mine, and the mine has not been fired, then energization of relay MR1 to attract its armature 31 forces contact member 28 to the left in opposition to spring 29, and resets the arming switch AS1 so that subsequent deenergization of relay MR1 disarms the mine. The construction of the equipment for each of the other mines is the same as that described for mine M1, the equipments for mines M2, M4 and M5 being shown complete, but those for mines M3 and M6 being shown conventionally only in order to simplify the drawings as much as possible.

It should be pointed out at this time that three different types of direct current relays, neutral, stick polar and biased polar are employed. The neutral relays operate to close front contacts when current of either polarity is applied to its winding and to close back contacts when the relay is deenergized. The stick polar relays are two-winding relays and are characterized by the fact that when the relay is deenergized the polar armature of the relay remains in the position to which it was last moved. In the drawings each stick polar relay is operated to close normal or left-hand contacts as viewed in the drawings only when positive energy is applied to the left-hand side of a winding of the relay, and is operated to close reverse or right-hand contacts only when positive energy is applied to the right-hand side of a winding of the relay. The biased polar relays are either one or two-winding relays, and the armature of each relay is biased, by means here illustrated as a spring, to the reverse or right-hand position. Each biased polar relay is operated to close normal or left-hand contacts only when positive energy is applied to the left-hand side of a winding of the relay. Positive energy applied to the right-hand side of a winding of a biased polar relay aids the bias to hold the relay at its reverse position. The normal and reverse contacts of each polar relay are designated N and R, respectively, with a proper numeral. Many of the relays are provided with a predetermined slow release period by an asymmetric unit connected in the usual well-known manner across a winding of the relay. In some instances, to avoid complexity in the wiring diagram, relay contacts are shown remote from the winding of the relays, which control those contacts, and in each such instance the relay contact is identified by a reference character corresponding to that of the associated relay.

The apparatus of the system can be conditioned for either full automatic operation, or for semi-automatic operation, or for manual operation, and in describing the operation of the apparatus I shall consider these three different conditions in the order named. In describing each such condition, a brief outline of the operation of the apparatus under that condition will be first given, and then the operation of the apparatus will be set forth in a step-by-step manner.

When the system is set for full automatic operation the apparatus is normally in an alert condition and the contacting or arming of a mine or mines initiates an operation cycle of the equipment at the office that first indicates what mines have been armed, fires all the armed mines, and then disarms all the mines that may have become armed due to the shock of firing the adjacent mines. The apparatus then assumes the normal or alert condition and remains thus until another mine is contacted. At this time, another operation cycle, identical to the one above will be initiated, and the contacted mine or mines will be indicated and fired and the other mines disarmed. This indicating, firing and disarming will be repeated automatically each time an unfired mine in the field is armed by engagement with a vessel. Manual operation of a push button or switch when the system is set for automatic operation will cause one mine on each side of a contacted mine to be automatically fired when the contacted mine is fired.

In the drawings the apparatus is shown in the normal or "alert" condition for automatic operation and under such alert condition, the office oscillators OS1, OS2 and OS3 are active, and the neutral relays W and W1 and stick polar relays Z1 and Z2 are energized. Relays W, Z1 and Z2 are energized in series by current supplied from positive terminal B of battery B1 through a normally closed contact 37 of a manually operable switch 2P, reverse contact 1R of stick polar relay K, winding of relay W, and the lower windings in series of relays Z2 and Z1 to negative terminal C of battery B1. Thus relay W is picked up and relays Z1 and Z2 are operated to the right. Relay W1 is energized over an obvious circuit including reverse polar contact 2R of relay K.

At distribution point DP1 biased polar relay LL1 and neutral relay LP1 are normally energized by current supplied to the transmitting circuit by the control battery B1, current flowing from positive terminal B of battery B1 through reverse polar contact 3R of relay K, ground electrode 39 and ground path to ground electrode 40 at distribution point DP1, top winding of relay LL1, asymmetric unit 41, impedance 42, conductor L1 back to the office OF, front contact 43 of relay W1, winding 44 of a transformer T2 to be referred to later, and reverse polar contact 4R of relay K to terminal C of battery B1. Relay LL1 is operated to the left and closes at its 1N contact a circuit path by which current flows through the lower winding of relay LL1 and winding of relay LP1 in multiple with the top winding of relay LL1 so that relay LP1 as well as relay LL1 is energized. Relay LP1 on picking up closes front contacts 45, 46 and 47 to connect conductor L1 to each of the conductors S1, S2 and S3 extending to the mines M1, M2 and M3, respectively. Fuses 48, 49 and 127 are interposed in conductors S1, S2 and S3, respectively. Similarly, relays LL2 and LP2 at distribution point DP2 are normally energized by current supplied from battery B1 to the transmitting circuit extending to distribution point DP2, current flowing from terminal B through the 3R contact of relay K to ground and the ground path to ground electrode 50 at distribution point DP2, and thence through top winding of relay LL2, asymmetric unit 51, impedance 52, conductor L2 back to the office, front contact 53 of relay W1, winding 54 of a transformer T3 to be referred to later, and 4R contact of relay K to terminal C. Relay LL2 is operated to close its normal contact 1N and current flows through the lower winding of relay LL2 and the winding of relay LP2 in multiple with the top winding of relay LL2, so that relay LP2 is energized and picked up closing front contacts 55, 56 and 128 to connect conductor L2 to the conductors S4, S5 and S6 extending to mines M4, M5 and M6, respectively. At distribution point DP2 fuses 57, 58 and 129 are interposed in the conductors S4, S5 and S6, respectively. It follows that each transmitting circuit is normally excited and each mine of each group of mines is normally in circuit with the respective transmitting circuit.

I shall assume that mines M1 and M5 are contacted by vessels to actuate the respective arming switches AS1 and AS5 to arm these mines in the manner explained hereinbefore. The closing of contact 28—30 of switch AS1 completes a low resistance shunt path from conductor L1 to ground through front contact 45 of relay LP1, fuse 48, conductor S1, impedance 83, detonator D1 and contact 28—30 to ground electrode 32. This low resistance shunt path shunts relays LL1 and LP1, and relay LL1 is operated to its biased position and relay LP1 is released. The release of relay LP1 to open front contacts 45, 46 and 47 opens the normal connections of conductors S1, S2 and S3 to conductor L1 so that thereafter the conductors S1, S2 and S3 can be connected to conductor L1 only through the respective receiving devices R1, R2 or R3, as will be shortly explained. Similarly the relays LL2 and LP2 at distribution point DP2 are shunted due to the low resistance path completed through contact 59—60 of arming switch AS5, and conductors S4, S5 and S6 are disconnected from conductor L2, so that thereafter these conductors S4, S5 and S6 can be connected to conductor L2 only through the respective receiving devices R4, R5 or R6.

The momentary increase in the flow of direct current in conductor L1, due to the shunt path completed at the arming switch AS1 induces an electromotive force in winding 61 of transformer T2 at the office, and biased polar relay K1 connected to winding 61 is momentarily energized at a polarity that operates it to its normal position. In like manner, biased polar relay K2 is operated momentarily to close its normal contact 1N by the electromotive force induced in transformer T3, due to the increase of current flowing in conductor L2 caused by the closing of the shunt path through the arming switch AS5. With either relay K1 or K2 operated to close its normal contact 1N, current flows from terminal B through the top winding of relay K, front contact 19 of relay W, and back contact 62 of relay WP to terminal C, and relay K is operated to its normal position, and being a polar stick relay, it remains in its normal position subsequent to the dying away of electromotive forces that momentarily operated relays K1 and K2. It is obvious that the contacting of any mine in any group of mines, regardless of the number of mines in a group or the number of groups in the mine field, will cause relay K at the office to be operated to its normal position.

This operation of relay K to its normal position initiates an operation cycle of the office control means that first indicates what mines have been contacted, then fires the contacted mines and then disarms all mines that become armed due to the shock of firing the contacted mines. At the first step of the operation cycle, the circuits for relays W and W1 are opened at the respective 1R and 2R contacts of relay K, and relay W1 releases at once and relay W releases at the end of a predetermined slow release period. Relay W1 upon releasing to open front contacts 43 and 53, opens the normal connections of battery B1 through transformers T1 and T3 to the respective transmitting circuits, so that no further operation of relays K1 and K2 can take place during the operation cycle. During the slow release period of relay W current flows from terminal B through normally closed contact 37 of switch 2P, 1N contact of relay K, front contact 63 of relay W, the two windings in series of biased polar relay X, back contact 64 of relay T, reverse polar contact 2R of relay Z1, and the lower winding of stick polar relay Y to terminal C. This operates relay X to close its normal contacts and relay Y to close its normal contacts if relay Y is not already in its normal position. Relay X thus operated to the left provides for itself a stick circuit at its contact 1N so that relay X is held to its normal position after relay W releases to open front contact 63. After relay X is operated, and before relay W is released, current is supplied to neutral relay O of the stepping relays in series with stick polar relay CR, current passing from terminal B through contact 2N of relay K, contact 2N of relay X, contact 3R of relay Z1, front contact 65 of relay W, wire 160, winding of relay O, and top winding of relay CR to terminal C. Relay O is picked up and provides through wire 161 and its front contact 66 a stick circuit by which it is retained energized after relay W is released. Relay CR is operated to its normal position, and being a stick polar relay it remains in its normal position until the indication portion of the operation cycle is finished, as will later appear. When relay K is operated to its normal position, the connection of battery B1 is reversed at contacts 3N and 4N of relay K so that the LL and LP relays at the different distribution points cannot be again energized during the operation cycle, current being blocked by the asymmetric units 41 and 51 of the distribution points.

At the next step of the operation cycle, relay W is released. Release of relay W to close back contact 90 energizes neutral relay WP over an obvious circuit, but relay WP performs no useful function at this time. Neutral relay I also receives current from terminal B through back contact 67 of relay W, wire 162, 3N contact of relay CR, front contact 68 of relay O, wire 163, winding of relay I and contact 69 of a push button 3P to terminal C. Relay I picks up and provides a stick circuit for itself through its own front contact 70 and wire 164, and remains energized until relay CR is reversed at the end of the indication portion of the operation cycle. Relay I on picking up to close front contacts 82, 97, 100, 107, 123 and 130 prepares circuits for the different sets of indication relays, and which circuits are closed one at a time by the stepping relays as the operation cycle progresses. Neutral relay T is also energized by a circuit extending from terminal B through back contact 71 of relay W, 3N contact of relay Y, wire 165, front contact 72 of relay O, wire 166 and winding of relay T to terminal C. The picking up of relay T to open back contact 64 and close front contact 73 shifts the circuit through relay X from the lower winding of relay Y to the top windings in series of relays Z1 and Z2, since contact 1N of relay Y is closed. This causes relays Z1 and Z2 to be operated to their normal positions with relay Y remaining at its normal position because it is of the stick polar type. Relay X is slow acting and is not operated by its bias during the interval the contacts of relay T are in transit.

Relay Z1 when operated to its normal position, starts the next step of the operation cycle. Stepping relay 0 is deenergized by the opening of the 3R contact of relay Z1 and relay 0 releases at the end of a predetermined slow release period. The next relay 1 of the stepping relays receives energy during the slow release period of relay 0, current flowing from terminal B through 2N contact of relay K, 2N contact of relay X, 4N contact of relay Z1, wire 167, front contact 74 of relay 0, and winding of relay 1 to terminal C. Relay 1 on picking up provides a stick circuit for itself at its own front contact 75. With relay 0 released and relay 1 picked up current is supplied to relay CO, current flowing from terminal B through 1N contact of relay Z2, wire 168, back contact 76 of relay 0, front contact 77 of relay 1 and winding of relay CO to terminal C. With relays 1 and CO picked up, the oscillator OS1 and the battery B1 in series with indication relays of the first mine of each group, are connected to the transmitting circuits. At distribution point DP1 the filter MF1 is the only one tuned to pass current of the f1 frequency, and hence periodic current flows from oscillator OS1 through wire 78, condenser 79, front contacts 80 and 81 of relays 1 and CO, respectively, conductor L1, filter MF1 and ground between electrodes 22 and 39 to oscillator OS1. The current thus passed by filter MF1 excites tube 21 of receiving device R1. Since mine M1 is assumed to be armed, a direct voltage from battery B1 is now applied to anode 35 of tube 21 simultaneously with the exciting of the control electrode 34 of the tube by the periodic current from oscillator OS1, the circuit from battery B1 being traced from terminal B through 3N contact of relay K, winding of biased polar indication relay A1, top winding of stick polar indication relay MK1, front contact 82 of relay I, wire 169, front contacts 80 and 81 of relays 1 and CO, respectively, conductor L1, anode 35 and tube space to cathode 33 of tube 21, fuse 48, conductor S1, impedance 83, detonator D1, contact 28—30 of switch AS1, ground path between electrodes 32 and 39, and 4N contact of relay K to terminal C. Tube 21 breaks down and direct current flows, the current being of sufficient value to operate indication relays A1 and MK1 but insufficient to fire detonator D1. Relay MK1 is operated to the left to close its 1N contact to complete an obvious circuit for an indication lamp LM1, and that lamp is illuminated to indicate the armed condition of mine M1. Relay MK1 being of the stick polar type, it remains at its normal position until the indications are cancelled at the end of the operation cycle. Relay MK1 also prepares a circuit to be shortly described, for automatically firing mine M1. The function of relay A1 will be explained hereinafter. Simultaneously with this action at distribution point DP1, periodic current from oscillator OS1 is supplied to distribution point DP2, the connection of oscillator OS1 to conductor L2 of the transmitting circuit extending to distribution point DP2 being completed through wire 78, condenser 170, and front contacts 84 and 85 of relays 1 and CO, respectively. At distribution point DP2, the filter MF4 is the only one that passes current of the f1 frequency, and tube 86 of receiving device R4 is excited.

However, mine M4 is not at this time armed and the circuit from battery B1 to the anode of tube 86 is open at arming switch AS4, with the result that the tube is not broken down, and no indication current flows to operate indication relays A4 and MK4 associated with mine M4, relays A4 and MK4 being interposed in a circuit connection from battery B1 to conductor L2 through front contact 107 of relay I, wire 173 and front contacts 84 and 85 of relays 1 and CO. It is obvious from the above that the arming of the first mine of each group of mines will be simultaneously indicated in the manner by which mine M1 is indicated during this step of the operation cycle.

Release of relay 0 at the beginning of this step of the operation cycle causes operation of relays T, Y, Z1 and Z2. Release of relay 0 to open front contact 72 deenergizes relay T, and relay T is at once released. The release of relay T to open front contact 73 and close back contact 64 shifts the circuit through relay X from the top windings of relays Z1 and Z2 to the top winding of relay Y, the connection including 1N contact of relay Z1. The relay Y is operated to the right to its reverse position, and relay T is reenergized and picked up by the circuit completed at back contact 71 of relay W, 3R contact of relay Y, wire 171, front contact 87 of relay 1 and wire 166. The picking up of relay T to open back contact 64 and close front contact 73 shifts the circuit through relay X from the top winding of relay Y to the lower windings of relays Z1 and Z2, because contact 1R of relay Y is now closed.

Relays Z1 and Z2 are now operated to the right to close their reverse contacts, to start the next step of the operation cycle. When relay Z2 is operated to the right, opening its 1N contact, the relay CO is deenergized and immediately releases to open the connections by which oscillator OS1 and battery B1 are connected to the transmitting circuits and all energy to the tubes of the respective receiving devices and to the respective indication relays is withdrawn. When relay Z1 operates to the right, opening its 4N contact and closing its 3R contact, relay 1 is deenergized and releases at the end of its slow release period and the next relay 2 of the stepping relays is picked up by current supplied from terminal B through the 2N contacts of relays K and X, 3R contact of relay Z1, wire 161, front contact 88 of relay 1 and winding of relay 2 to terminal C. Relay 2 on picking up provides a stick circuit for itself at its own front contact 89. When relay 1 releases opening front contacts 80 and 84, the respective indication relays for the first mine of each group are further disconnected from the transmitting circuits and remain disconnected for the remaining portion of the operation cycle. However, relay MK1 remains at its normal position to continue the illumination of the indication lamp LM1. With relay 1 released and relay 2 picked up, the CO relay is reenergized over a circuit including terminal B, the 2R contact of relay Z2, wire 172, back contact 91 of relay 1, front contact 92 of relay 2, winding of relay CO and terminal C. With relays 2 and CO picked up, oscillator OS2 and the indication relays for the second mine of each group in series with battery B1 are connected to the transmitting circuits. The connection of oscillator OS2 to conductor L1 of the first transmitting circuit includes wire 93, condenser 94 and front contacts 95 and 81 of relays 2 and CO, respectively; and the connection to conductor L2 of the second circuit includes wire 93, condenser 183, front contact 98 of relay 2 and front contact 85 of relay CO. Filter MF2 is the only one at distribution point DP1 tuned to pass current of the frequency *f*2 and the tube 96 of receiving device R2 is excited, but since mine M2 is not armed the extension of the transmitting circuit through conductor S2 is open at arming switch AS2 and no direct voltage from battery B1 through indication relays A2 and MK2 is applied to tube 96 to break down the tube and hence no indication current flows to operate indication relays A2 and MK2 associated with mine M2. At distribution point DP2 the filter MF5 is tuned to pass periodic current of the frequency *f*2, and hence electron tube 99 of receiving device R5 is excited. Since mine M5 is assumed to be armed, direct voltage from battery B1 is applied to anode 101 of tube 99 and tube 99 breaks down to permit indication current to flow, the circuit extending from terminal B of battery B1 through 3N contact of relay K, winding of indication relay A5, top winding of indication relay MK5, front contact 100 of relay I, wire 185, front contacts 98 and 85 of relays 2 and CO, respectively, conductor L2, anode 101 and tube space to cathode 102 of tube 99, fuse 58, conductor S5, impedance 103, detonator D5, contact 59—60 of switch AS5, ground path between electrodes 104 and 39 and 4N contact of relay K to terminal C. This indication current is sufficient to operate relays A5 and MK5 but is not sufficient to fire detonator D5. The closing of contact 1N of relay MK5 completes an obvious circuit for lamp LM5 to illuminate that lamp as an indication that mine M5 is armed. Operation of relay MK5 to the left also prepares a circuit for firing mine M5 as will shortly appear. The function of relay A5 will be pointed out later.

The release of relay 1 at the start of this step of the operation cycle causes an operation of relays T, Y, Z1 and Z2. Release of relay 1 to open front contact 87 deenergizes relay T, and relay T immediately releases to open front contact 73 and close back contact 64 and shift the circuit through relay X from the lower windings of relays Z1 and Z2 to the lower winding of relay Y, and relay Y is operated to the left. When relay Y is operated to the left, relay T is reenergized over the circuit completed at back contact 71 of relay W, 3N contact of relay Y, wire 165, front contact 105 of relay 2 and wire 166. The picking up of relay T to open back contact 64 and close front contact 73 shifts the circuit through relay X from the lower winding of relay Y to the top windings of relays Z1 and Z2.

Relays Z1 and Z2 are now operated to the left to start the next step of the operation cycle. Operation of relay Z2 to the left to open its 2R contact deenergizes relay CO and that relay releases at once to remove oscillator OS2 and battery B1 from the transmitting circuits, permitting the corresponding receiving devices and indication relays to become deenergized. When relay Z1 operates to the left to open its 3R contact, relay 2 is deenergized and releases at the end of its slow release period and the next relay 3 of the stepping relays is energized by current supplied from terminal B through the 2N contacts of relays K and X, the 4N contact of relay Z1, wire 167, front contact 106 of relay 2 and winding of relay 3 to terminal C. Relay 3 on picking up provides a stick circuit for itself and its own front contact 177. With relay 2 released and relay 3 picked up, relay CO is reenergized by the circuit including 1N contact of relay Z2, wire 168, back contact 108 of relay 2 and front contact 109 of relay 3. With relays 3 and CO picked up, the oscillator OS3 and battery B1 in series with the indication relays for the third mine of each group are connected to the transmitting circuits. The connection of oscillator OS1 to conductor L1 is completed through wire 174, condenser 175, front contact 110 of relay 3 and front contact 81 of relay CO; and the connection to conductor L2 is completed through wire 174, condenser 176, front contact 111 of relay 3 and front contact 85 of relay CO. The filters of receiving devices R3 and R6 are the ones tuned to pass current at the *f*3 frequency, and hence the associated electron tubes are excited. Since mines M3 and M6 are not at this time armed, no direct voltage from battery B1 is applied to the devices R3 and R6, and no indication current flows to energize the indication relays associated for mines M3 and M6.

Release of relay 2 at the start of this step of the operation cycle, causes an operation of relays T, Y, Z1 and Z2. Relay T is deenergized, due to the opening of front contact 105 of relay 2, and relay T upon releasing shifts the circuit through relay X from the top windings of relays Z1 and Z2 to the top winding of relay Y, and relay Y is operated to the right. Relay T is now reenergized over the circuit including 3R contact of relay Y, wire 171, front contact 112 of relay 3, and wire 166, and relay T on picking up shifts the circuit through relay X from the top winding of relay Y to the lower windings of relays Z1 and Z2.

Relays Z1 and Z2 are now operated to the right to start the next step of the operation cycle. When relay Z2 is operated to the right to open its 1N contact, relay CO is deenergized and immediately releases to remove oscillator OS3 and battery B1 from the transmitting circuits. With relay Z1 operated to the right to open its 4N contact, relay 3 is deenergized and releases at the end of its slow release period. During this slow release period of relay 3, the next relay 6 of the stepping chain is energized by current flowing from terminal B through the 2N contacts of relays K and X, 3R contact of relay Z1, wire 161, front contact 113 of relay 3, 1N contact of relay CR, and winding of relay 6 to terminal C. Relay 6 is the final relay of the stepping relays, since as stated hereinbefore, only three mines of each group of mines are shown. It is evident, I believe, that more than three mines can be included in each group, and the additional mines selectively indicated and controlled by providing additional oscillators to supply periodic currents of different frequencies and by providing additional relays in the stepping chain of relays, there being provided one additional stepping relay for each additional mine of each group. There would also be provided, of course, additional indication relays. The additional stepping relays would be successively operated in the manner similar to the operation of relays 1, 2 and 3 to successively connect the additional oscillators and indication relays to the transmitting circuits.

The picking up of relay 6 of the stepping relays, starts the firing portion of the operation cycle. When relay 3 releases at the end of the indication portion of the operation cycle, the relay CR is operated to the right by energy supplied from terminal B through 2N contacts of relays K and X, 3R contact of relay Z1, wire 161, lower winding of relay CR, front contact 114 of relay 6 and winding of relay 6 to terminal C. With relay CR operated to the right, the "firing power" relay FP is provided with the following circuit, terminal B, 2R contact of relay Y, wire 178, front contact 115 of relay 6, 2R contact of relay CR, contact 116 of a two-position switch 4P and winding of relay FP to terminal C. Operation of relay CR to the right to open its 3N contact deenergizes relay I, and relay I releases at once to disconnect all indication relays, but the relays MK1 and MK5 still remain at their normal positions so that lamps LM1 and LM5 continue to be illuminated. Relay CO is now energized by current supplied from terminal B through 2R contact of relay Z2, wire 172, back contact 117 of relay 3 and front contact 118 of relay 6. With indication relays MK1 and MK5 operated to the left and relay CO picked up, oscillators OS1 and OS2 are connected to the transmitting circuits to excite the receiving devices of the armed mines, oscillator OS1 being connected to conductor L1 over wire 78, 2N contact of relay MK1, front contact 119 of relay FP and front contact 81 of relay CO; and oscillator OS2 being connected to conductor L2 over wire 93, 2N contact of relay MK5 and front contacts 120 and 85 of relays FP and CO, respectively. Periodic current from oscillator OS1 excites tube 21 of receiving device R1 and periodic current from oscillator OS2 excites tube 99 of receiving device R5 in the manner already explained. Simultaneously with this exciting of tubes 21 and 99, the battery B2 is connected to the anode of these tubes over the transmitting circuits, the circuit for tube 21 extending from the positive terminal of battery B2 through a winding of biased polar relay LK, front contact 121 of relay FP, impedance 122, front contact 81 of relay CO, conductor L1, anode 35 and tube space to cathode 33 of tube 21, the circuit extension to mine M1, and ground path between electrodes 32 and 123 to the negative terminal of battery B2. The circuit for tube 99 extends from the positive terminal of battery B2 through the winding of relay LK, front contact 124 of relay FP, impedance 125, front contact 85 of relay CO, conductor L2, anode 101 and tube space to cathode 102 of tube 99, the circuit extension to mine M5 and the ground path between electrodes 104 and 123 to the negative terminal of battery B2. The voltage of battery B2 breaks down tubes 21 and 99 and instantly fires detonators D1 and D5 of mines M1 and M5. From the foregoing description and from an inspection of the drawings it is evident that additional mines, if armed, would be automatically and instantly fired.

The apparatus when set for automatic operation is "locked" at the firing step of the operation cycle until all armed mines are fired and the fuses at the distribution points for the fired mines are blown. It is to be noted that when relay 3 is released and relay 6 is picked up at the start of the firing portion of the operation cycle, the relay T is energized over a circuit completed at back contact 71 of relay W, 3R contact of relay Y, wire 171, front contact 156 of relay 6, 2R contact of relay LK and wire 166. As firing current flows relay LK is operated to the left to open its 2R contact and relay T is deenergized and released to shift the circuit through relay X from the lower windings of relays Z1 and Z2 to the lower winding of relay Y. This causes relay Y to be operated to the left, so that relay T will not be reenergized until relay LK is operated back to its reverse position by its bias and again closes its 2R contact, the circuit for relay T being then completed through back contact 71 of relay W, 3N contact of relay Y, wire 165, front contact 125 of relay 6, contact 131 of switch 4P, 2R contact of relay LK and wire 166. Relay LK cannot be operated back to its biased position until the armed mines are fired, and the fuses blown, for as soon as a mine is fired, the mine cable S becomes grounded and current continues to flow from battery B2 through relay LK until the corresponding fuse blows. As soon as the armed mines are all fired and the cables S disconnected from the distribution points by the blowing of the corresponding fuses, then current from battery B2 ceases and relay LK is operated to its biased position. It is to be noted that when relay Y is last operated to the left, the circuit for relay FP was opened at 2R contact of relay Y, but that relay FP is retained energized by a stick circuit including terminal B, 1N contact of relay LK, front contact 126 and winding of relay FP, and terminal C. Operation of relay LK at the end of the firing of the mines thus released relay FP to disconnect all oscillators as well as the firing battery B2 from the transmitting circuits. Operation of relay LK to its bias position to energize relay T over the circuit previously traced causes relay T to pick up to shift the circuit through relay X from the lower winding of relay Y to the top windings of relays Z1 and Z2, and relays Z1 and Z2 are operated to the left. With relays Z1 and Z2 operated to the left, both relays 6 and CO are deenergized and released, relay 6 releasing at the end of a predetermined slow release period, but relay CO releasing at once. This terminates the firing portion of the operation cycle and starts a disarming portion.

Firing of a mine produces shocks that may arm an adjacent mine and the office control apparatus functions to disarm such armed mines. When relays Z1 and Z2 operate to left, as explained above, to deenergize relays 6 and CO and complete the firing portion of the operation cycle, relay I is again energized by a circuit including 2N contacts of relays K and X, 4N contact of relay Z1, wire 167 and front contact 132 of relay 6. Release of relay 6 completes a circuit for "reset" relay RS, such circuit extending from terminal B through back contact 67 of relay W, wire 162, 3R contact of relay CR, back contact 133 of relay 6 and winding of relay RS to terminal C. With relay I picked up and relay 6 released, relay CO receives energy from terminal B through 1N contact of relay Z2, wire 168, back contact 134 of relay 6, front contact 77 of relay I and winding of relay CO to terminal C. Relays I and CO are now picked up to connect oscillator OS1 to the transmitting circuit, the connection to conductor L1 of the first transmitting circuit being completed at front contacts 80 and 81 of relays I and CO, respectively; and the connection to conductor L2 of the second transmitting circuit being completed at front contacts 84 and 85 of relays I and CO, respectively. Current from oscillator OS1 now serves to excite the tubes of the receiving devices R1 and R4 in the manner already explained. With reset relay RS picked up, winding 184 of transformer T1, the source of 60 cycle alternating current, is connected to the transmitting circuits, the connection to conductor L1 of the first circuit being completed at front contact 135 of relay RS, condenser 179 and front contact 81 of relay CO; and the connection to conductor L2 of the second transmitting circuit being completed at front contact 136 of relay RS, condenser 180 and front contact 85 of relay CO. At distribution point DP1 this 60 cycle alternating current accomplishes nothing in the way of ionizing tube 21, because mine M1 has been fired. At distribution point DP2, the 60 cycle current applied to the anode of tube 86 causes that tube to be ionized and positive half cycles of the 60 cycle current are supplied through filter FT4 at mine M4 to relay MR4 and relay MR4 is energized to reset arming switch AS4 in the event the mine has been armed due to the shock of firing mine M5.

Relay T is deenergized when relay 6 is released to open front contact 125 and relay T upon releasing shifts the circuit through relay X from the top windings of relays Z1 and Z2 to the top winding of relay Y, and relay Y is operated to the right so that relay T is reenergized over the circuit including 3R contact of relay Y, wire 171 and front contact 87 of relay 1. Relay T on picking up shifts the circuit through relay X from the top winding of relay Y to the lower windings of relays Z1 and Z2 and these latter relays are operated to the right. The operation of relay Z2 to the right to open its 1N contact deenergizes relay CO and relay CO immediately releases to disconnect the oscillator OS1 and transformer T1 from the transmitting circuits. Relay MR4 of mine M4 is now deenergized and the mine is disarmed. Operation of relay Z1 to the right to open its 4N contact deenergizes relay 1, and relay 1 is released at the end of its slow release period. Relay 2 is energized during the slow release period of relay 1, the circuit for relay 2 including the 3R contact for relay Z1, wire 161 and front contact 88 of relay 1. With relay 1 released and relay 2 picked up, the relay CO is reenergized by means of the circuit completed at back contact 91 of relay 1 and front contact 92 of relay 2, and with relays 2 and CO picked up the oscillator OS2 is connected to the transmitting circuits, the connection to conductor L1 being completed at front contact 95 of relay 2 and front contact 81 of relay CO, and the connection to conductor L2 being completed at front contact 98 of relay 2 and front contact 85 of relay CO. Since reset relay RS is still energized, the transformer T1 is also connected to the transmitting circuits through the connections explained hereinbefore. Periodic current from oscillator OS2 and 60 cycle alternating current from transformer T1 are now delivered to the distribution points. At distribution point DP1 tube 96 is excited and breaks down so that current is delivered to relay MR2 of mine M2 and that relay energized to reset the arming switch AS2 in the event mine M2 has become armed due to the shock of firing the adjacent mine M1. At distribution point DP2 nothing happens because mine M5 has been fired. The control means at the office automatically continues to successively operate the stepping relays in the manner explained during the indication portion of the operation cycle, and the oscillators are connected one at a time to the transmitting circuits, transformer T1 being connected to the circuits simultaneously with each oscillator. It follows that each receiving device at the distribution points will be excited and the MR relay of the corresponding mine energized and then deenergized to disarm any armed mine. It should be noted that during this disarming portion of the operation cycle, the relay I remains released and all indication relays are disconnected from the transmitting circuits.

When relays Z1 and Z2 are operated to the right at the completion of the last disarming step, the control apparatus automatically restores to its normal or alert condition in the following manner. At the end of the disarming portion of the operation cycle, relay 12 is energized, current being supplied to relay 12 by a circuit extending from terminal B through 2N contact of relay K, 2N contact of relay X, 3R contact of relay Z1, wire 161, front contact 113 of relay 3, 1R contact of relay CR and winding of relay 12 to terminal C. Relay 12 now picks up and provides a stick circuit for itself at its own front contact 137. When relay 3 is released at the end of its slow release period, the opening of front contact 112 causes relay T to be deenergized and released to shift the circuit through relay X from the lower windings of relays Z1 and Z2 to the lower winding of relay Y, and relay Y is operated to the left. Now with relay 12 picked up and relay T released, the relay K receives current from terminal B through front contact 138 of relay 12, wire 181, back contact 139 of relay T, front contact 140 of relay WP, since relay WP is now picked up, and lower winding of relay K to terminal C. This operates relay K back to its reverse position to open the circuit for relays X, Y, Z1 and Z2. Relay X being of the biased polar type, it operates to its bias reverse position, while relays Y, Z1 and Z2 remain at the position to which they were last moved. The circuit for the stepping relays is now opened at contact 2N of relay K, and the circuits for relays W and W1 are closed at the 1R and 2R contacts of relay K. Relay W on picking up to open back contacts 67 and 90 deenergizes relays RS and WP, relay RS releasing at once and relay WP releasing at the end of a predetermined slow release period. Operation of relay K to close its 3R and 4R contacts connects battery B1 to the transmitting circuits at its normal polarity so that the LL and LP relays at each distribution point are reenergized. The sudden increase of flow of direct current through relays LL1 and LP1 at distribution point DP1 causes an electromotive force to be induced in winding 61 of transformer T2, and relay K1 is momentarily operated to close its 1N contact. Similarly, relay K2 is operated to close its 1N contact due to the electromotive forces induced in transformer T3 due to the flow of current through the LL2 and LP2 relays at distribution point DP2. Relay K however, is not operated by this momentary operation of relays K1 and K2 because the circuit for the top winding of relay K is held open at back contact 62 of relay WP, relay WP being provided with a slow release period sufficiently long that it is not released until after relays K1 and K2 are operated back to their biased positions. When relay WP subsequently releases the apparatus is restored to its alert conditions. It is to be observed that the indication relays MK1 and MK5 corresponding to the fired mines M1 and M5 remain at their normal positions causing the corresponding indication lamps to continue to be illuminated.

In the event other mines are now armed due to a vessel coming in contact therewith, the control apparatus automatically functions to indicate the armed mine, fire the armed mine, disarm mines that become armed due to the shock of firing the armed mine, and then restore itself to the alert condition by an operation cycle similar to that described hereinbefore. Such cycle of operation will be repeated as long as there remains any mine of a field to be fired.

Under automatic operation of the apparatus provision is made whereby two adjacent mines, one on either side of a contacted mine, are automatically fired, if desired, when the contacted mine is fired. This is accomplished as follows: Assume that the operator has actuated push button IP to close contact 141 and mine M2 has been contacted by a vessel and an operation cycle, similar to that already described, has progressed to the point where the indication relays A2 and MK2 are operated to their normal positions so that lamp LM2 is illuminated to indicate the armed condition of mine M2. Energy is now applied to the lower winding of each indication relay MK1 and MK3 for the mines M1 and M3, the circuit for relay MK1 being completed from terminal B through contact 141 of push button IP, IN contact of relay A2 and lower winding of relay MK1 to a mid terminal BL of battery B1; and the circuit for relay MK3 being the same as that traced for relay MK1 up to push button IP and thence through the 2N contact of relay A2 and the lower winding of relay MK3 to terminal BL. Both relays MK1 and MK3 are now operated to close their respective 2N contacts so that oscillators OS1 and OS3 are connected to the transmitting circuit along with oscillator OS2 during the firing portion of the operation cycle, with the result that mines M1 and M3 are simultaneously fired with mine M2. In connection with firing mines M1 and M3 with mine M2, it is considered that arming switches AS1 and AS3 are actuated to arm mines M1 and M3 due to the shock of firing mine M2.

In semi-automatic operation of the apparatus, the contacting of a mine or mines initiates a cycle of operation similar to that described in connection with full automatic operation of the apparatus, but in the case of semi-automatic operation, the cycle of operation is stopped just prior to the firing portion of the cycle. At this point, if desired, any or all mines indicated armed may be manually cancelled or mines other than the ones indicated armed may be manually added. Then by manual operation of a push button or firing switch the cycle of operation is permitted to continue. This automatically fires the selected mines and then disarms all those mines that were armed due to the shock of firing the selected mines.

Under semi-automatic operation, the apparatus is at its alert condition and the firing switch 4P is set to open its contacts 116 and 113. When a mine or mines are contacted by a vessel, the operation cycle of the control apparatus similar to that explained under automatic operation is initiated to indicate the contacted mine and such operation need not be repeated. This operation cycle continues until relay 3 releases and relay 6 picks up to start the firing portion of the operation cycle. Firing relay FP is not supplied with energy because contact 116 of switch 4P is open and relay LK remains at its bias position because no firing current flows with the result that relay T is held energized by the circuit completed through back contact 71 of relay W, 3R contact of relay Y, wire 171, front contact 156 of relay 6, 2R contact of relay LK and wire 166, and further progression of the operation cycle is stopped. The contacted mines are indicated by the respective indication lamps. The operator when ready closes the firing switch 4P and the operation cycle then progresses to fire the contacted mine, disarm mines that are armed due to the shock and then the apparatus is restored to its normal alert condition, this part of the operation cycle being the same as that described for automatic operation. I shall now assume that under semi-automatic operation mine M1 is contacted and the control apparatus operates to the firing portion, leaving lamp LM1 illuminated to indicate the contacted mine M1, and that the operator desires to fire mine M2 along with mine M1. The operator would actuate a push button 2AB (see upper left-hand portion of Fig. 1a). Operation of push button 2AB completes a circuit from terminal B through push button 2AB and the lower winding of indication relay MK2 to terminal BL, and relay MK2 is operated to the left. Operation of relay MK2 to the left to close its 1N contact causes lamp LM2 to be illuminated, and the closing of contact 2N of relay MK2 prepares the circuit by which oscillator OS2 is connected to the transmitting circuit during the firing portion of the operation cycle. The operator now closes switch 4P to permit the progression of the operation cycle of the control apparatus, with the result that mine M2 would be fired along with mine M1, assuming of course that the shock of firing mine M1 causes mine M2 to become armed. If the operator desired to fire additional mines, he would actuate the AB push button of such mines as he desired to fire. In the event some of the additional mines selected by the operator are so far removed from the contacted mine that they would not be armed by the shock of firing the contacted mine, the operator would actuate a push button 5P previous to the closing of switch 4P. The closing of push button 5P energizes relay RS over an obvious circuit including contact 142 of push button 5P. The firing switch 4P is now moved to its closed position and the control apparatus continues the operation cycle and with relay RS picked up 60 cycle alternating current is supplied to the transmitting circuits and passed by the receiving devices excited by the periodic current supplied by the oscillators so that the MR relays of such mines as have been selected are energized to arm the mine. Current of 600 volts supplied by battery B2 is effective to fire all the armed mines. If the operator desires to disarm some mine that has become armed through the contact by a vessel, he can do so by actuating a canceling push button CB. For example, assuming mines M1 and M2 have become armed due to contact by a vessel, and the operation cycle has progressed to illuminate lamps LM1 and LM2, the operation cycle stopped at the firing portion of the cycle and the operator wishes to disarm mine M1 and allow mine M2 to be fired, he would actuate a canceling push button 1CB (see upper left-hand portion of Fig. 1a). Closing of push button 1CB completes the circuit for energizing the lower winding of indication relay 1MK, relay 1MK having previously been operated to its normal position during the indication portion of the operation cycle. Closing of push button 1CB permits current to flow from mid terminal BL of battery B1 through lower winding of relay 1MK and the contact of push button 1CB to terminal C of battery B1, and current flows in relay 1MK in the direction to operate the relay to its reverse position to open its 2N contact by which oscillator OS1 is connected to the transmitting circuit. The operator would then close the firing switch 4P to continue the operation cycle of the control apparatus and only mine M2 would be fired. In like manner operation of any of the other canceling push buttons CB associated with the different indication relays serves to cancel armed mines.

When the system is set for manual operation any mine may be fired at any time, regardless of whether or not it has been contacted by a vessel, by first actuating a manual firing switch and then closing the arming push button AB for the mine to be fired. For manual operation, the control means is made non active by two-position switch 2P being set to open contact 37 and close contact 143. The opening of contact 37 deenergizes relay W and removes current from relays X, Y, Z1 and Z2 and prevents any automatic operation of the stepping relays. The closing of contact 143 of switch 2P operates relay K to the left, current being supplied during the slow release period of relay W from terminal B through contact 143, top winding of relay K, front contact 19 of relay W and back contact 62 of relay WP to terminal C. Operation of relay K to the left releases relay W1 to open the connections from battery B1 through transformers T1 and T3 to the transmitting circuits. For manual operation, a firing switch 6P is set to close its contacts 144, 145 and 146 and current is supplied by obvious circuits to relays CO, RS and FP. With these relays picked up battery B2 and transformer T1 are connected to the transmitting circuits by circuit connections pointed out hereinbefore. If now the arming push button 1AB, for example, is closed, the corresponding indication relay MK1 is operated to the left to close its 2N contact and oscillator OS1 is connected to the transmitting circuit extending to distribution point DP1 to excite the receiving device R1 so that 60 cycle current is passed to mine M1 where it energizes relay MR1 to arm the mine, and 600 volt direct current from battery B2 flows through receiving device R1 and the detonator D1 to fire the mine. Any of the other mines can be fired in a similar manner by actuating the corresponding AB push button. When the desired mines have been fired manually and further manual operation is not desired, the apparatus can be set for either automatic operation or semi-automatic operation by restoring switches 2P and 6P to their normal positions. The operation of switch 6P to its normal open position deenergizes relays CO, RS and FP to disconnect all current sources from the transmitting circuits. The closing of contact 37 of switch 2P supplies current from terminal B through contact 37, contact 147 of a push button 7P, 3R contact of relay X, front contact 140 of relay WP and lower winding of relay K to terminal C, and relay K is operated to its reverse position, causing in turn the relays W and W1 to be picked up with the result that the apparatus is restored to its alert condition.

When mines are fired manually and adjacent mines are armed by the shock, such adjacent mines can be disarmed after the alert condition is restored, by operation of push buttons 7P and 3P, switch 4P being at its open position. The closing of contact 148 of push button 7P causes relay BG to be energized over an obvious circuit and the closing of contact 149 of push button 7P completes the previously traced circuit for relay K to operate relay K to the left. This operation of relay K deenergizes relays W and W1 and initiates an operation cycle of the stepping relay similar to that described under full automatic control. Relay I is now deenergized however because contact 69 of push button 3P is open and relay I upon being released disconnects the indication relays from the transmitting circuits while the stepping relays are progressively operated. Relay RS is energized, however, over a circuit including terminal B, back contact 67 of relay W, front contact 150 of relay BG, wire 182 and winding of relay RS to terminal C. With relay RS picked up, transformer T1 is connected to the transmitting circuits as previously explained. Thus, as the stepping relays 1, 2 and 3 are picked up during the operation cycle, and the oscillators OS1, OS2 and OS3 are connected to the transmitting circuits, the electron tubes of the various receiving devices become excited and are ionized due to the presence of the 60 cycle current, with the result that energy is passed to the various mines to energize the respective MR relays, and any mine that has become armed due to shock of a fired mine is disarmed. Since switch 4P is open, the operation cycle is stopped at the end of the indication portion.

The apparatus restores to the alert condition when push buttons 3P and 7P are reclosed. The opening of contact 148 of push button 7P opens the pick-up circuit of relay BG but relay BG is now retained energized over a stick circuit including front contact 152 of relay WP and front contact 153 of relay BG. Relay K now receives energy from terminal B through contact 37 of switch 2P, contact 154 of switch 7P, front contact 155 of relay BG, front contact 140 of relay WP and lower winding of relay K to terminal C, and relay K is operated to the right. This operation of relay K deenergizes relay X and in turn relay 6, and reenergizes relays W and W1. The picking up of relay W opens back contacts 67 and 90 causing relays RS and WP to be deenergized. The picking up of relay W1 to close front contacts 43 and 53, connects battery B1 to the transmitting circuit so that the LL and LP relays at each distribution point are energized. Relay WP releases at the end of its slow release period to open front contact 152 and deenergize relay BG, with the result that the system is restored to its normal alert condition.

Provision has been made for testing each mine to see that everything is in proper working condition. In order to test the equipment of a mine the firing switch 4P would be open and testing switch 7P set to close contacts 148 and 149. Closing of contacts 148 and 149 energizes relay BG and operates relay K to the left as explained hereinbefore. This operation of relay K releases relays W and W1 and the apparatus automatically progresses through its operation cycle in the manner explained hereinbefore up to the picking up of relay 6 at the start of the firing portion of the cycle. This operation of relay K also deenergizes the LL and LP relays at the distribution points. During the progressive operation the oscillators OS1, OS2 and OS3 are connected one at a time to the transmitting circuits, and the receiving devices at the distribution points are in turn excited. Since relay RS is now picked up over the circuit including front contact 150 of relay BG and relay I is energized in the usual manner, the 60 cycle alternating current from transformer T1 and the respective indication relay MK in series with battery B1 are connected to the transmitting circuits simultaneously with the connecting of each oscillator to the transmitting circuits. As the various receiving devices are excited, the 60 cycle current is applied to the anode of the respective tube causing current to be passed through the tube to the respective mine, and the respective MR relay is picked up to close the respective arming switch AS. The closing of each arming switch completes the circuit path through the detonator with the result that current from battery B1 flows through the indication relays MK and the detonator. It is to be observed that the current from battery B1 through the indication relays and the individual detonators is of a value insufficient to fire the mine, but is sufficient to operate the indication relays. The operation of each indication relay MK to the left is a check that the circuits for the corresponding mine are all intact. If the system is functioning properly, the indication relay MK for each mine in the entire field would be operated to cause all the indication lamps to be illuminated when the complete operation cycle is ended. If the system is not functioning properly one or a number of the individual indication lamps, depending upon where the fault is, will be dark when the operation cycle ceases. A clue as to what the fault might be, if any, may be obtained by observing the indication light or combination of lights that remain dark. After a test operation, the system may be restored to the normal alert condition by restoring push button 7P to its closed position. Each indication relay MK should then be reset by operation of the respective canceling push button CB.

Apparatus here disclosed has the advantages that automatic indication at the control point of the contacting and arming of any or all mines of a mine field is effected, automatic or semi-automatic firing of any or all the contacted mines is provided, automatic firing of other mines in addition to the contacted mine may be effected, semi-automatic firing of any number of mines in addition to the ones contacted may be accomplished, manually firing of all or any of the mines of the entire field whether contacted or not may be accomplished, automatic disarming of all mines that are armed as a result of firing adjacent mines is provided, periodic testing of the equipment of each mine may be accomplished without firing the mine, and the several functions are all accomplished by a single two-conductor transmitting circuit for each group of mines.

Although I have herein shown and described only one form of selective control and indication system embodying my invention, it is understood that various changes and modifications may be made therein within the scope of appended claims without departing from the spirit and scope of my invention.

Having thus described my invention, what I claim is:

1. In combination, an office and a remote point connected by a transmitting circuit which is normally excited by an office source of direct current of a preselected low voltage, an office source of oscillating current of a preselected frequency, an office source of direct current of a preselected high voltage, an office source of current of a preselected particular characteristic, normally inactive office control means operable either to simultaneously connect said oscillating current source and said high voltage direct current source to said circuit or simultaneously connect the periodic current source and said particular characteristic current source to the circuit, a circuit controller having a normally open contact which becomes closed in response to a predetermined event, a circuit path including said contact connected across said circuit at said remote point to create an increase in the flow of direct current in said circuit when the contact becomes closed, office means connected to said circuit energized by such increase of direct current to initiate operation of said control means, receiving relay means at said point connected to said circuit and energized only by current of said preselected frequency, an operating element which is operated only by current of said high voltage connected to said circuit by said receiving relay means when energized, and reset relay means energized only by current of said particular characteristic and connected to said circuit by said receiving relay means when energized for restoring said contact to its open position.

2. In combination, an office and a remote point connected by a transmitting circuit which is normally excited by an office source of direct current to energize a remote point relay connected across the circuit, an office source of oscillating current of a preselected frequency, an office indication relay, normally inactive office control means operable to connect said source of oscillating current to said circuit and to interpose said indication relay in the connection of said direct current source to the circuit, an electrical equipment having a normally open contact which becomes closed in response to a predetermined event, a shunt path including a front contact of said remote point relay and said controller contact to shunt said circuit to release said remote point relay and to create a momentary increase in the flow of current in said circuit when said contact becomes closed, office means connected to said circuit energized by such increase in the flow of direct current to initiate operation of said control means, and receiving relay means at said point connected to said circuit and energized only by current of said preselected frequency to connect said controller contact across said circuit independently of said remote point relay for energizing said indication relay when the controller contact is closed.

3. In combination, an office and a remote point connected by a transmitting circuit which is normally excited by an office source of direct current to energize a remote point relay connected across the circuit, an office source of oscillating current of a preselected frequency, an office source of operating current of a preselected high voltage, normally inactive office control means operable to connect said oscillating current source and said operating current source to said circuit, an electrical equipment having a normally open controller contact which becomes closed in response to a predetermined event and an operating element which is operated only when supplied with current of said preselected high voltage, receiving relay means at said point connected to said circuit and energized only by current of said preselected frequency, a first circuit path across said circuit and including a front contact of said remote point relay and said controller contact; a second circuit path across said circuit including said controller contact, said operating element and an element made conductive only when said receiving relay means is energized; said first circuit path to shunt said circuit when said controller contact is closed to release said remote point relay and to create an impulse of direct current in said circuit, an office means connected to said circuit energized by such impulse of direct current to initiate operation of said control means for operation of said operating element due to said second circuit path.

4. In combination, an office and a remote point connected by a transmitting circuit which is normally excited by an office source of direct current, a plurality of equipments associated with said remote point each having a normally open contact which becomes closed in response to a predetermined event individual to the equipment, a plurality of office sources of periodic currents of different frequencies with a different source assigned to each equipment, a plurality of receiving devices one for each of said equipments, said devices connected in multiple to said circuit at said remote point, each said device energized only by current of the frequency of the periodic current source assigned to the associated equipment, normally inactive office control means operable to selectively connect the periodic current sources to said circuit, relay means at said remote point controlled by said controller contacts to cause an impulse of direct current to flow in said circuit when any one of the controller contacts is closed, office means connected to said circuit energized by such impulse of direct current to initiate operation of said control means, and operating means for each of said equipments rendered active by the associated receiving device when energized.

5. In combination, an office and a remote point connected by a transmitting circuit which is normally excited by an office source of direct current, a plurality of equipments associated with said remote point each having a normally open controller contact which becomes closed in response to a predetermined event individual to the equipment, a plurality of office sources of periodic currents of different frequencies with a different source assigned to each equipment, a plurality of receiving devices one for each of said equipments, said devices connected in multiple to said circuit at said remote point and each said device energized only by current of the frequency of the periodic current source assigned to the associated equipment, a plurality of office indication means one for each of said equipments, normally inactive office control means operable to successively connect said periodic current sources and indication means to said circuit with the source and indication means for each equipment simultaneously connected to the circuit, relay means at said point controlled by said controller contacts to cause an impulse of direct current to flow in said circuit when any one of said contacts is closed, office means connected to said circuit energized by such impulse of direct current to initiate operation of said control means, and means governed by each receiving device to complete a path across said circuit through the controller contact of the associated equipment to energize the indication means of the same equipment by said direct current source.

6. In combination, an office and a remote point connected by a transmitting circuit which is normally excited by an office source of direct current, a plurality of sources of periodic currents of different preselected frequencies, a plurality of office indication relays there being a relay associated with each periodic current source, normally inactive office control means operable to connect in a step-by-step manner the periodic current sources and indication relays to said circuit with an associated source and relay simultaneously connected, receiving devices one associated with each periodic current source and connected to said circuit in multiple at said point, each receiving device energized only by current of the frequency of the respective source, electrical equipments one associated with each receiving device, each equipment provided with a nor-
mally open contact which becomes closed in response to a predetermined event, relay means at said point connected to said circuit and governed by said contacts to create a momentary flow of direct current in said circuit when any one of the contacts becomes closed, office means connected to said circuit energized by such momentary flow of current in initiating an operation of said control means, and means governed by each receiving device and the contact of the associated equipment to condition said circuit to energize the associated indication relay by said direct current source.

7. In combination, an office and a remote point connected by a transmitting circuit which is normally excited by an office source of direct current of a preselected low voltage, a plurality of office sources of periodic currents of different frequencies, an office source of direct current of a preselected high voltage, a normally inactive office control means operable to connect said high voltage source and preselected ones of the periodic current sources to the circuit, receiving devices one associated with each periodic current source connected to said circuit in multiple at said remote point, each receiving device energized only by current of the frequency of the associated source, electrical equipments one for each receiving device, each said equipments including an operating element which is operated only by current of said high voltage and a contact which becomes closed in response to a predetermined event, relay means at said point connected to said circuit and governed by said contacts to create a momentary flow of current in said circuit when any one of said contacts becomes closed, office means connected to said circuit energized by such momentary flow of current to initiate an operation of said control means, and circuit means governed by each receiving device and the contact of the associated equipment to connect the operating element of the same equipment to said circuit for operation of the element by current supplied by said high voltage direct current source.

8. In combination, an office and a remote point connected by a transmitting circuit which is normally excited by an office low voltage source of direct current, a control relay at said point connected to said circuit to be energized by said low voltage source of direct current, a group of mines each provided with a normally open arming switch and a detonator which when supplied with current of a preselected high voltage fires the mine, a circuit extension for each mine including the respective detonator and arming switch, each said circuit extensions connected to said circuit through a front contact of said control relay, receiving devices one for each mine and connected in multiple to said circuit at said point, each such device energized only by periodic current of a frequency preselected for the individual device, each device when energized to connect the circuit extension of the respective mine to said circuit independent of said control relay, office sources of periodic currents one for each mine and each source of the frequency preselected for the receiving device of the same mine, an office source of direct current of said high voltage, normally inactive office control means operable to connect said high voltage source and preselected ones of said periodic current sources to the circuit, and office means connected to said circuit energized to initiate operation of said control means in response to the impulse of direct current created in said circuit due to said low voltage current source when an arming switch is closed.

9. In combination, an office and a remote point connected by a transmitting circuit which is normally excited by an office low voltage source of direct current, a control relay at said point connected to said circuit to be energized by said low voltage source of direct current, a group of mines each provided with a normally open arming switch and a detonator which when supplied with current of a preselected high voltage fires the mine, a circuit extension for each mine including the respective detonator and arming switch, each said circuit extensions connected to said circuit through a front contact of said control relay, receiving devices one for each mine and connected in multiple to said circuit at said point, each such device energized only by periodic current of a frequency preselected for the individual device, each device when energized to connect the circuit extension of the respective mine to said circuit independent of said control relay, office sources of periodic currents one for each mine and each source of the frequency preselected for the receiving device of the same mine, an office source of direct current of said high voltage, office indication relays one for each of said mines, normally inactive office control means having an operation cycle comprising an indication portion to connect step-by-step the periodic current sources and indication relays to said circuit to energize the indication relay of any mine whose arming switch is closed and a firing portion to connect the periodic current sources and said high voltage current source to said circuit to fire any mine whose arming switch is closed, and office means connected to said circuit energized to initiate an operation cycle of said control means in response to the low voltage impulse of direct current created in said circuit when an arming switch is closed.

10. In combination, a plurality of mines each of which is provided with an arming switch and a detonator, a transmitting circuit between a distribution point and a remote office, a circuit extension for each mine connected to said transmitting circuit at said point and including the respective detonator and arming switch, an office source of direct current connected to said transmitting circuit, a control relay connected to the circuit at said point to be energized by said source of direct current, said control relay having a front contact interposed in each of said circuit extensions, selective means including office sources of periodic currents of different frequencies and receiving devices connected across said transmitting circuit at said distribution point there being a preselected source and device assigned to each mine and each device energized only by current of the frequency of the respective source, normally inactive office control means having an operation cycle to connect said periodic current sources to said transmitting circuit, office means connected to said transmitting circuit energized to initiate an operation cycle of said control means in response to an impulse of direct current created in the transmitting circuit due to the closing of any one of the arming switches, and means governed by each receiving device to connect the associated circuit extension to a high voltage source of direct current to fire the detonator of a mine whose arming switch is closed.

11. In combination, a plurality of mines each of which is provided with an arming switch and a detonator, a transmitting circuit between a distribution point and a remote office, a circuit extension for each mine connected to said transmitting circuit at said point and including the respective detonator and arming switch, an office source of direct current connected to said transmitting circuit, a control relay connected to the circuit at said point to be energized by said source of direct current, said control relay having a front contact interposed in each of said circuit extensions, selective means including office sources of periodic currents of different frequencies and receiving devices connected across said transmitting circuit at said distribution point there being a preselected source and device assigned to each mine, each said device energized only by current of the frequency of the respective source and connecting when energized the associated circuit extension to the transmitting circuit, office indication relays one for each mine, office control means provided with an operation cycle having an indication portion and a firing portion, said control means connecting the indication relay and periodic current source of the different mines to said circuit successively during said indication portion to energize the indication relay of any mine whose arming switch is closed, means controlled by said indication relays and said control means to connect the periodic current sources and a firing current source to said circuit during said firing portion to fire the detonator of any mine whose arming switch is closed, and office means connected to said circuit energized to initiate operation of said control means by the current impulse created in said circuit when any arming switch is closed.

12. In combination, a mine provided with a normally open arming switch and a detonator which when supplied with current of a preselected high voltage fires the mine, a transmitting circuit between the mine and a remote office and normally excited with an office source of direct current of a preselected low voltage, a control relay connected across said circuit normally energized by said low voltage source, a low resistance path including a front contact of said control relay and said arming switch to shunt said circuit when the arming switch is closed, a receiving device connected to said circuit and excited only by current of a preselected frequency, another circuit path including said detonator and said arming switch connected across said circuit when said receiving device is excited, an office indication relay, an office source of current of said preselected frequency, an office source of current of said preselected high voltage, office control means set into operation in response to the increase of current flowing in said circuit caused by said low resistance path to connect said preselected frequency current source to said circuit and to interpose said indication relay in the connection of said low voltage current source to energize said indication relay due to said other circuit path, and means controlled by said indication relay and said control means to connect said preselected frequency current source and said high voltage current source to said circuit to fire the mine due to said other circuit path.

13. In combination; a mine provided with an arming switch, a detonator and a reset relay; a transmitting circuit between said mine and a remote office and normally excited by an office source of low voltage direct current, a control relay at said mine connected to said circuit to be energized by said source of low voltage direct current, a first circuit path including a front contact of said control relay and said arming switch to shunt said circuit when the arming switch is closed, a receiving device connected to said circuit and energized only by periodic current of a preselected frequency, a second circuit path completed by said device when energized to connect said reset relay and said detonator to said circuit in multiple; office equipment including a source of periodic current of said preselected frequency, a source of direct current of said high voltage, a source of current of particular characteristic, an office indication relay and a control means; means governed by said control means to connect said indication relay and said periodic current source to said circuit to energize said indication relay by current supplied by said low voltage current source through said second circuit path, means governed by said indication relay and said control means to connect said periodic current source and said high voltage current source to said circuit to fire said detonator, other means governed by said control means to connect said periodic current source and said source of current of particular characteristic to said circuit to energize said reset relay, and means connected to said circuit and energized by the impulse of current created in said circuit by said first circuit path to govern said control means.

14. In combination, a transmitting circuit, a receiving device including a filter and a gas triode tube, said filter tuned to pass only periodic current of a preselected frequency and interposed between said circuit and a control electrode of said tube, said tube having its anode to cathode space interposed in a circuit extension connected across said transmitting circuit, a circuit path including an operating element and a normally open controller contact connected across said circuit extension, said operating element actuated only when supplied with direct current of a preselected high voltage; a remote office provided with an indication relay, a source of periodic current of said preselected frequency, a direct current source of said preselected high voltage and a direct current source of a preselected low voltage; means to simultaneously connect said periodic current source and said indication relay in series with said low voltage current source to said circuit to energize said indication relay through said receiving device when said controller contact is closed, and other means to simultaneously connect said periodic current source and said high voltage current source to said circuit to actuate said operating element through said receiving device when said controller contact is closed.

15. In combination, a transmitting circuit, a receiving device including a filter and a gas triode tube, said filter tuned to pass only periodic current of a preselected frequency and interposed between said circuit and a control electrode of said tube, said tube having its anode to cathode space interposed in a circuit extension connected across said transmitting circuit, a circuit path including an operating element and a normally open controller contact connected across said circuit extension, said operating element actuated only when supplied with direct current of a preselected high voltage; another circuit path including a filter and a reset relay connected across said circuit extension, said last mentioned filter tuned to pass only current of a given low frequency and said reset relay operable when energized to actuate said controller contact; a remote office provided with an indication relay, a source of periodic current of said preselected frequency, a source of direct current of said preselected high voltage, a source of direct current of a preselected low voltage and a source of said low frequency current; means to simultaneously connect said periodic current source and said indication relay in series with said low voltage source to said circuit to energize said indication relay through said receiving device when said controller contact is closed, means to simultaneously connect said periodic current source and said high voltage current source to said circuit to actuate said operating element when said controller contact is closed, and means to simultaneously connect said periodic current source and said low frequency current source to said circuit to energize said reset relay through said receiving device.

16. In combination; a mine provided with an arming switch, a detonator and a reset device; said detonator to fire the mine only when supplied with current of a preselected high voltage and said reset device to actuate the arming switch to disarm the mine only when supplied with current of a given characteristic, a transmitting circuit, a receiving device including a filter and a gas triode tube connected to said circuit, said filter tuned to pass only periodic current of a preselected frequency, said tube having its anode to cathode space interposed in a circuit extension connecting said mine to said circuit; a remote office provided with an indication means, a source of periodic current, a source of direct current of said preselected high voltage, a source of direct current of a preselected low voltage and a source of current of said given characteristic; and office control means operable to progressively and selectively connect said indication means and said several current sources to said circuit as required to excite said receiving device for indicating the arming of the mine, for firing the mine and for disarming the mine when not fired.

17. In combination; a mine provided with an arming switch, a detonator and a reset device; said detonator to fire the mine only when supplied with current of a preselected high voltage and said reset device to actuate the arming switch to disarm the mine only when supplied with current of a given characteristic, a transmitting circuit, a receiving device including a filter and a gas triode tube connected to said circuit, said filter tuned to pass only periodic current of a preselected frequency, said tube having its anode to cathode space interposed in a circuit extension connecting said mine to said circuit; a remote office provided with an indication means, a source of periodic current, a source of direct current of said preselected high voltage, a source of direct current of a preselected low voltage and a source of current of said given characteristic; said low voltage current source normally connected to said circuit; normally inactive office control means operable to progressively and selectively connect said indication means and said several current sources to said circuit as required to excite said receiving device for indicating the arming of the mine, for firing the mine and for disarming the mine; and means including a transformer interposed in said circuit at said office and a control relay connected across the circuit at said mine and controlled by said arming switch to create an electromotive force to initiate operation of the control means when said mine is armed.

ALFRED B. MILLER.